United States Patent [19]

Gurny et al.

[11] Patent Number: 4,972,594
[45] Date of Patent: Nov. 27, 1990

[54] DYNAMIC FEELER HEAD

[75] Inventors: Werner Gurny, Wadgassen; Eberhard Häusler, Saarbrücken, both of Fed. Rep. of Germany

[73] Assignee: Wegu-Messtechnik GmbH, Wadgassen, Fed. Rep. of Germany

[21] Appl. No.: 337,615

[22] Filed: Apr. 10, 1989

[30] Foreign Application Priority Data

Apr. 12, 1988 [DE] Fed. Rep. of Germany ....... 3812110
Sep. 21, 1988 [DE] Fed. Rep. of Germany ....... 3831975

[51] Int. Cl.$^5$ .............................................. G01B 5/00
[52] U.S. Cl. ............................................ 33/561; 33/558
[58] Field of Search ................. 33/556, 557, 558, 559, 33/560, 561, 503, 504, 556, 557, 558, 559, 560, 561; 310/336

[56] References Cited

U.S. PATENT DOCUMENTS

| | | | |
|---|---|---|---|
| 4,177,568 | 12/1979 | Werner et al. | 33/DIG. 2 |
| 4,701,659 | 10/1987 | Fujii et al. | 310/800 |
| 4,769,919 | 9/1988 | Lloyd et al. | 33/558 |
| 4,785,545 | 11/1988 | Aubebe | 33/558 |
| 4,816,713 | 3/1989 | Change, Jr. | 310/338 |
| 4,823,802 | 4/1989 | Romanovskaya | 310/340 |
| 4,833,792 | 5/1989 | Achnelt et al. | 33/558 |

FOREIGN PATENT DOCUMENTS 2049198 12/1980 United Kingdom ................. 33/561

Primary Examiner—William A. Cuchlinski, Jr.
Assistant Examiner—Alvin Wirthlin
Attorney, Agent, or Firm—Wood, Herron & Evans

[57] ABSTRACT

A piezo-controlled dynamic probe or feeler head for measuring installations and measuring machine, which is in an operative connection with a measurement evaluating or plotting unit and, selectively with a measuring machine control. The probe is constructed from two mutually independently operating measuring signal generating installations, which are equipped with mutually separate or independent circuits and which act in such a manner on the measuring evaluating or plotting unit and, selectively, on the measuring machine control, that upon the generation of a signal from the first measuring signal generating installation, stored data regarding the position of the probe can be recognized as being valid only at the presence of a confirmation or acknowledging signal from the second measuring signal generating installation.

10 Claims, 2 Drawing Sheets

DYNAMIC FEELER HEAD

BACKGROUND OF THE INVENTION

1. Field of the Invention

The present invention relates to a piezo-controlled dynamic probe or feeler head for measuring installations and measuring machine, which is in an operative connection with a measurement evaluating or plotting unit and, selectively with a measuring machine control.

2. Discussion of the Prior Art

From the disclosure of German Patent No. 28 41 548 there has become known a method and an arrangement for determining measurements on test samples through the utilization of a sensor or mechanical probe which is movable relative thereto, as well as at least one measurement indicator or pick-up. In this instance, there is measured the force which, during the measuring sequence, after the contacting of the probe and the test sample, will build up therebetween. Upon the reaching of a predetermined value for this force, there is generated a signal which is employed for maintaining the measurement, which is present at the measurement indicator at the point in time of the reaching of the pregiven value of the force. A piezo-electric power measuring element is arranged between the probe and its suspension, which emits the required signal which is employed for the stopping of a counter. On the basis of the foregoing there is simultaneously terminated the relative movement between the probe and the test sample. Through the intermediary of this known installation, the test sample is conveyed over a displaceable measuring table against the probe. Upon the contacting of the test sample by the probe, there are generated electrical impulses by the measurement indicator or pick-up, which are counted by a counter. The relative movement between the probe and the test sample is then continued for so long until a pregiven measuring force is reached intermediate these two elements. This signifies that not already through the light contacting of the probe against the test sample is a valid measurement signal emitted and indicated, but only first upon the attainment of a predetermined measuring force. In this method and the proposed installation it appears to be problematic that, under particular circumstances, there can be prescribed an excessively high measuring force, which can lead to errors in measurement and to damaging of the installations. From the standpoint of the technology, the method and the installation appear to be too complex, and do not deliver any guarantee for precise measurements.

SUMMARY OF THE INVENTION

Accordingly, it is an object of the present invention to preclude erroneous measurements for a piezo-controlled controlled dynamic sensor or probe, without the need for any increased technological demands.

This object is inventively achieved in that the sensor or probe is constructed from two mutually independently operating measuring signal generating installations, which are equipped with mutually separate or independent circuits and which act in such a manner on the measuring evaluating or plotting unit and, selectively, on the measuring machine control, that upon the generation of a signal from the first measuring signal generating installation, stored data regarding the position of the probe can be recognized as being valid only at the presence of a confirmation or acknowledging signal from the second measuring signal generating installation. Thereby, the first measuring signal generating installation can be constituted from a thin piezoelectric layer which is arranged in a substrate and which is in connection with at least one contact element, whereas the second measuring signal generating installation can be constituted from a feeler or probe which is deflectable in at least one coordinate direction, which similarly is in connection with a contact element for transmitting a measuring signal, whereby with every signal from the first measuring signal generating installation there is maintained in the measuring evaluating unit a new count position for the condition of the probe, and the finally reached count condition is then freed for processing in the presence of the confirmation or acknowledging signal from the second measuring signal generating installation.

Thus, for the generation of a measuring signal, there is merely provided a piezo foil which immediately delivers a signal in response to the pressure produced by the contacting, which is electronically reformed and is employed as a contact signal for the reading in of positional data for the probe. The accurate mechanical deflecting system with sensor pins or styli is similarly equipped with switch contacts. The utilization of the piezo signal by itself can lead to erroneous measurements, inasmuch as environmental influences or a high acceleration of the probe can occasion undesired signals from the piezo-electric layer. However, when there is additionally utilized the confirmation signal which is generated with the deflection of a probe stylus, then erroneous measurements are basically precluded. This is because positional data for the probe which are stored during the generating of the piezo signal are only valid at the concurrent presence of the deflecting signal from the probe styli.

Pursuant to an embodiment of the invention, the piezo-electric layer can be rigidly clamped between two electrically-insulating plates, which are retained into a carrier or support consisting of a lower abutment and a receiving housing which is arranged thereabove, and which is under the action of a variable spring force, whereby the lower abutment is connected with the probe housing and the second measuring signal generating installation; and wherein the contact element which is connected with the piezo-electric layer is conducted through one of the insulating plates and through the intermediary of an electrical line is in contact with the measurement evaluating unit and, selectively, with the measuring machine control. Hereby, the piezo-electric layer can be constructed from three sectors which are separated from each other, and each of these sectors can be in connection with its own contact element. Moreover, it is additionally possible to construct the piezo-electric layer as a thin foil which is rigidly restrained between two discs in the support. The advantage of this installation consists of the technologically simple assembly of this first measuring signal generating installation, which is essentially constituted from a piezo-electric layer which is fixedly clamped between two plates and by means of contact pins is connected with the measuring evaluating unit and the machine control. Hereby, it is an important feature of the invention that the foil is constituted of a high-density polymer foil and not, as is known, of ceramic. The piezo-electric element, in contrast with the usual piezo components consisting of ceramic blocks, does not operate as an acceleration pick-up, but as a power pick-up. This power pick-up has the advantage that it can be employed and introduced quasi-statically as well as also dynamically.

Pursuant to a still further embodiment of the invention, the disc which is arranged below the piezo-electric layer can be provided with a central cutout, in which there is arranged the shoulder of a bushing which protrudes through a central bore provided in the piezo-electric layer and the upper disc, and which is clamped on by a threaded bolt above the upper disc. As a result thereof, the piezo-electric foil is retained in an exact and fixedly clamped position.

In order to be able to achieve an electrical screening against external influences, the surfaces of the discs which face away from the piezo-electric layer can be imparted a copper lining or coating.

Further advantages offer themselves in that the contact elements are pins which, commencing from the piezo-electric layer, are conducted through an insulating disc in the receiving housing, and are connected through electrical lines with a preamplifier which, in turn, is in an operative connection through a further electrical line with the measurement evaluating unit and, selectively, with the measuring machine control. Through the advantageous operative interposition of a preamplifier, the generated signals from the piezo-electric layer are clearly recognized as measurement signals, which are transmitted to the coordinate measuring installation for further processing.

Any change in the clamping forces for the piezo-electric layer, pursuant to a further feature of the invention can be undertaken in that the upper receiving housing stands under the action of a compression spring which is acted upon by a spring-tensioning device and which is axially displaceably connected with the housing for the probe.

In accordance with a further feature of the invention, axially below the abutment for the piezo-electric layer, the probe housing can be equipped with the probe styli and the deflecting mechanics which is inserted into the probe housing, which possesses the measurements signal transmitter which is in connection through an electrical line with the measurement evaluating unit and, selectively, with the measuring machine control. Thereby, in an advantageous and simple manner, built in below the first measuring signal generating installation, within the common probe housing is the second measuring signal generating installation.

Finally, the contact elements can be arranged on the piezo-electric layer in such a manner and so interconnected with each other, that for a layer which is not divided there is achieved a measuring signal in response to an axial contacting, whereas with a layer which is constituted from three sectors, the signals of the individual sectors are processed separately in such a manner that at an axial contacting there is evaluated the sum of the three measuring signals and at a tangential contacting there is utilized the difference between two measuring signals. This signifies that the voltage from two to one sector is presently amplified. At a loading in one direction, there can appear two equal signals, which can occur in the other direction as oppositely directed measuring signals, as a result of which the polarity is different. All signals are rectified and presently added. The triple sectorial subdivision of the piezo foil allows for a tangential contacting. In that instance there is produced a bending load on the foil, at which the overall loading or strain on the foil remains constant. An undivided foil, in contrast therewith, delivers measuring signals only under an axial contacting or touching. The measuring signals from the individual sectors are basically separately processed. During the axial contacting there is utilized the sum of the three signals, whereas at a tangential contacting there is utilized the difference between two measuring signals.

A definite time interval can be prescribed between the signal from the first measuring generating installation and that from the second measuring signal generating installation, such that the signal from the first measuring signal generating installation can be ascertained as being valid. Through the simple measure there is achieved a still greater operational reliability.

The piezo-controlled dynamic feeler or probe which is equipped with the above-described features is provided with two separate switching circuits. For the generation of the one measuring signal, a piezo foil is applied on a rigid substrate or support, which immediately delivers a signal through the pressure generated by the contacting, which is electronically converted and employed as a contacting signal for the entry or recording of positional data for the probe. The precise mechanical deflection system is similarly provided with switch contacts. However, in this instance a signal is generated only at a certain deflection, which confirms the contacting or touching. As has been already mentioned, by itself the utilization of the piezo signals alone will occasionally lead to errors in measurement, inasmuch as environmental influences and high accelerations of the feeler or probe, or also vibrations from the measuring machine, can result in the generating of undesired piezo signals. However, when there is additionally utilized the confirmation signal which is generated upon the deflection of the probe stylus, such errors in measurement are basically precluded. The positional data for the probe which are stored during the generation of the piezo signal have validity only at the concurrent presence of the deflecting signal for the probe styli. The measuring signals are presently electrically processed for connection to coordinate measuring machines. The processing of the measuring signals is carried out in the coordinate measuring machines through suitable software.

With respect to the piezo-electric layer, there is thusly employed a mechanical feeler or probe which delivers an electrical measuring signal through contacts. Through the intermediary of this contacting signal, which is also an overrun signal, there is confirmed the measuring signal which has been previously transmitted from the piezo component. The first signal from the piezo electric layer is then always recognized as being an error signal predicated on vibrations or high accelerations of the probe when there is an absence of the second signal from the deflecting mechanisms for the probe. The signal from the first measuring signal generating installation always freezes in again the count condition, which is continually transmitted thereto. Only when there is present the signal from the second measuring signal generating installation, then there is also assumed the first signal from the piezo-electric layer. Until that time, the error signals are always recorded over.

BRIEF DESCRIPTION OF THE DRAWINGS

Reference may now be had to the following detailed description of preferred embodiments of the invention, taken in conjunction with the accompanying drawings; in which.

DETAILED DESCRIPTION

Figure 1:
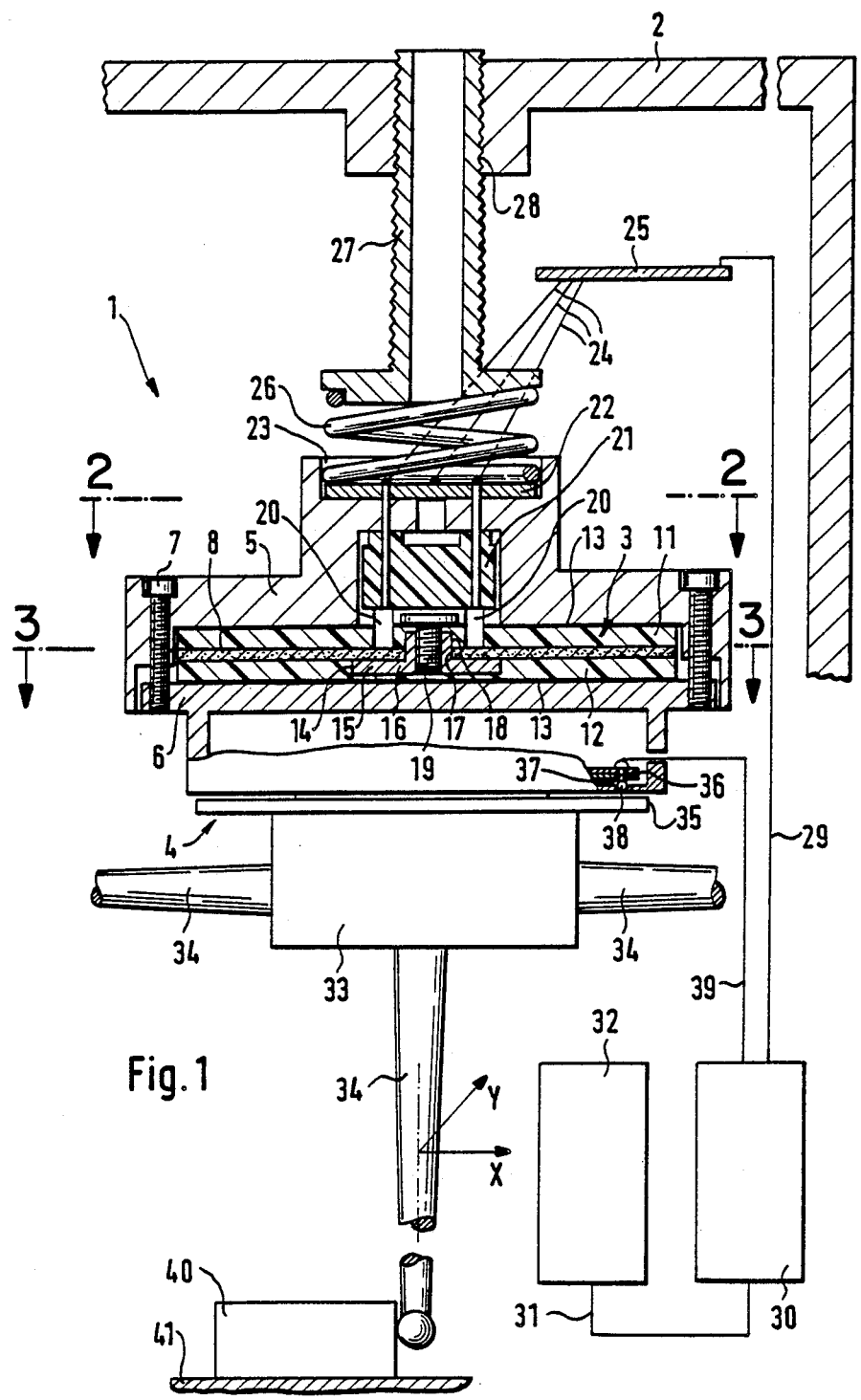
FIG. 1 illustrates in a longitudinal partially sectional view, the piezo-controlled dynamic feeler or probe which is constructed pursuant to the invention.
Figure 2:
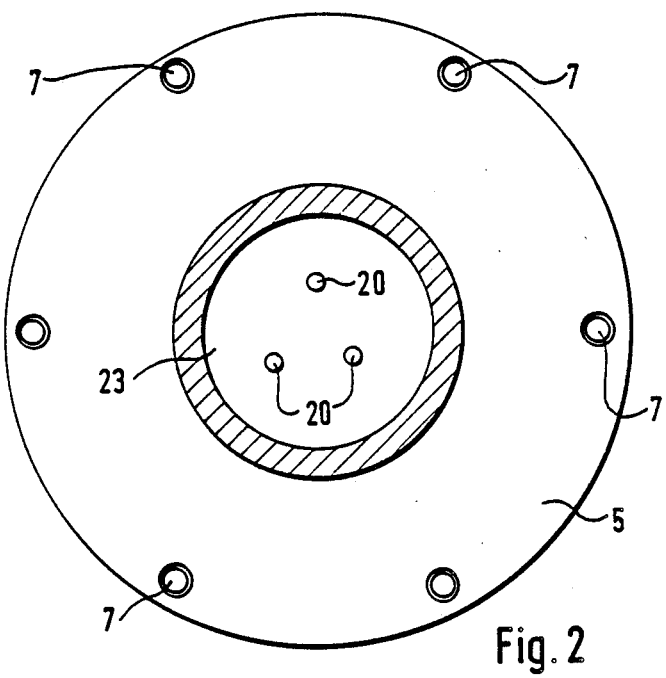
FIG. 2 illustrates a top plan view of the receiving housing for the probe, taken along line II—II in FIG. 1.

As seen in FIG. 1, the piezo-controlled dynamic feeler or probe head 1 is inserted into a probe housing 2 of a coordinate measuring installation or multi-coordinate measuring machine which is not illustrated in further detail. The probe 1 contains a first measuring signal generating installation 3 and a second measuring signal generating installation 4, both of which operate separately from each other and are arranged axially one below the other within the probe housing 2.

Figure 3:
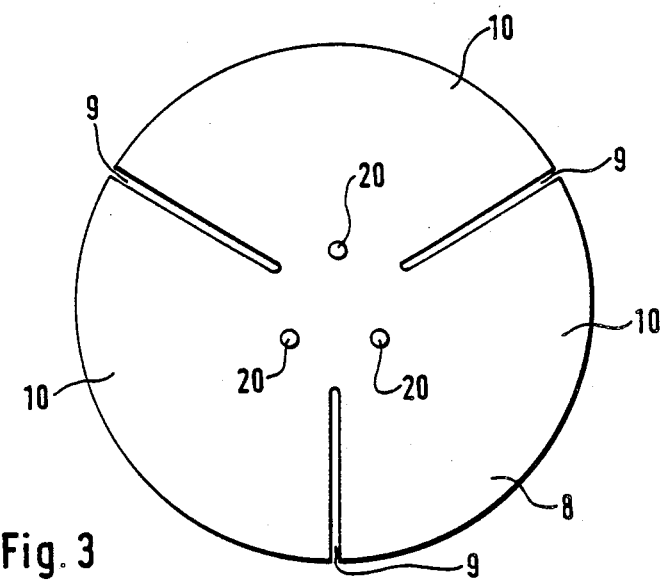
FIG. 3 illustrates a top plan view of the piezo-electric layer, taken along III—III in FIG. 1.

The first measuring signal generating installation 3 consists of a receiving housing 5 which is detachably connected with an abutment 6 through the use of screws 7. Within the receiving housing 5 there is arranged a piezo-electric layer 8, which can be a piezo foil and, in conformance with FIG. 3, can be provided with three cuts or slots 9 which are offset by 120° relative to each other for the formation of three sectors 10. The piezo-electric layer 8 is fixedly clamped-in through two discs 11, 12 which are constituted from an electrically-insulating material, and which on surfaces thereof facing away from the piezo-electric layer 8 are provided with copper coatings 13 so as to achieve a screening against external influences. Centrally provided in the lower disc 12 is a cutout 14, into which there is inserted a flange or shoulder 15 on a threaded bushing, whose threaded sleeve 16 is conducted through a central bore 17 in the piezo-electric layer 8 and through a further corresponding bore 18 provided in the upper disc 11. By means of a screw 19, the shoulder 15 of the threaded sleeve 16 is clamped against the piezo-electric layer 8, and pressed against the contact elements 20 which are in the shape of pins.

In conformance with the number of the segments 10 of the piezo-electric layer 8 (FIG. 3), there are provided three contact elements 20 which are offset by presently 120° relative to each other along a single circular arc, and which have their lower bottom surfaces standing on the piezo-electric layer. The contact elements 20 as so arranged and electrically connected with each other in a manner such that there are always plotted or recorded the measuring signals between two of three sectors 10. The contact elements 20 are conducted through an insulating disc 21 to a further disc 22, which is located in a circular cutout 23 in the receiving housing 5. Electrical lines 24 lead from these contact elements 20 to a preamplifier 25.

The receiving or pick-up housing 5 or, in essence, the piezo-electric layer 8, stand under the action of a compression spring 26, which has a clamping device 27 acting thereon and which is axially displaceably connected with the probe housing 2 by means of screwthreads 28. Through the rotation of the clamping device 27 within the screw thread 28, a longitudinal axial displacement takes place, which either increasingly tensions or loosens the coil spring 26 in accordance with the effected direction of rotation of the clamping device 27. As a result thereof, there is adjusted the spring force which acts on the receiving housing 5.

An electrical connecting line 29 leads from the preamplifier 25 to a measurement evaluating or recording unit 30 which is preferably located externally of the probe housing 2. The measurement evaluating unit 30 is connected by means of a further line 31 with the measuring machine control 32. In this instance, it is naturally also possible to provide for the interconnection of memory or data storages.

The second measuring signal generating installation 4 consists of a sensor or probe 33 with inserted feelers or styli 34. Arranged in a connecting housing 35 for the probe 33 is the measurements signal transmitter 36, which is schematically illustrated in Fig. 1 in a simplified representation. In this simplified represented measurements signal transmitter, the contacting is effectuated through a pin 37 and a contact ball 38. The pin 37 is similarly connected with the measurement evaluating unit 30 through an electrical line 39.

At the approach of the probe 1 to a workpiece 40 which is to be measured on the measuring table 41 of a coordinate measuring machine, already prior to the probe styli 34 reaching the workpiece 40, measuring signals are generated by means of the first measuring signal generating installation 3. This is encountered on the basis of alone the acceleration of the probe, through possible slight vibrations during the approach cycle or other environmental influences. Every such influence is taken into cognizance by the piezo-electric layer 8, and by means of the contact elements 20 and the lines 24, is continually transmitted to an amplifier 25. The amplified measurement signals are then transmitted further from the preamplifier 25 to the measuring value evaluating unit 30 and initially continuously maintained therein in an installed counter. Every further measuring signal from the piezo-electric layer, which is transmitted in the above-described path from the counter into the measuring evaluating unit 30, is newly recorded over. In conformance with the direction of movement in one of the coordinates X or Y, as a result, there are continually maintained the positional data for the probe 1. By means of the machine control 32, the probe 1 is further displaced, inasmuch as all heretofore transmitted measurement signals were interpreted as being erroneous signals with regard to the contacting or touching against a workpiece 40. Only upon an effectuated contacting of the probe 1 with the probe stylus 34 against a workpiece 40, and the resultant deflection of the probe stylus 34, is there similarly delivered a measurement signal through the measuring signal transmitter 36 to the measuring evaluating unit 30. This measurement signal from the second measuring signal generating arrangement 4 is the confirming signal for the final measurement signal delivered up to this instant from the piezo-electric layer 8. Due to the confirming signal, the measuring evaluating unit 30 recognizes the previously emitted signal from the first measuring generating installation 3 as a valid measurement signal, and then evaluates both of these measurement signals. The evaluation of the measurement signals produces a measurement data which, when represented in a display unit (not shown), can be stored in a memory storage or data of the measuring machine, printed out by a printer (not shown), or conveyed to the measuring machine control 32. The two measurement signals are presently electrically processed for connection to coordinate measuring machines, whereby their processing is effected through suitable software.

A measurement signal from the first measuring signal generating installation 3 can naturally first occur only when the stylus 34 of the probe 33 contacts against a workpiece 40. However, since the piezo-electric layer 8 operates essentially more sensitively than the measuring signal transmitter 36 of the second measuring signal generating installation 4, also in this instance will the confirming signal be implemented always only subsequent to the signal from the first measuring signal generating installation 3. Every influence generates a voltage across the piezo-electric foil, which is conducted through the contact elements 20 to the preamplifier 25 and can be processed therein into a usable measurement signal.

What is claimed is:

1. A piezo-controlled dynamic feeler or probe for measuring installations and measuring machines, said probe being in operative connection with a measuring evaluating unit and selectively with a measuring machine control said probe comprising:

two measuring signal generating installations operating separately from each other;

said first measuring signal generating installation having a thin piezo-electric layer fixedly clamped between an upper and a lower rigid electrically insulating disc and being in electrical connection with at least one contact element, said discs being retained in a support having a lower abutment and a receiving housing arranged thereabove and under the action of a variable spring force, said lower disc having a central cut-out, a shoulder on a threaded bushing being inserted into said cut-out, said bushing extending through a central bore in said piezo-electric layer and in said upper disc, said bushing being clamped above said upper disc by a threaded bolt; and said second measuring signal generating installation having a feeler which is deflectable in at least one coordinate direction.

2. A probe as claimed in claim 1, said first and second measuring signal generating installations having separate control circuits and acting on said measuring evaluating unit and selectively on said measuring machine control such that positional data for the probe which is stored upon the generation of a signal from the first measuring signal generating installation can be recognized as being valid only in the presence of a confirming signal from the second measuring signal generating installation, whereby with each signal from the first measuring signal generating installation there is maintained a new count condition in the measuring evaluating unit for the position of the probe and the finally reached count condition is then release for processing upon the presence of the confirming signal from the second measuring signal generating installation.

3. A probe as claimed in claim 2, wherein a defined time interval is prescribed between the signal from the first measuring signal generating installation and the signal from the second measuring signal generating installation so as to enable the signal from the first measuring signal generating installation to be recognized as being a valid signal.

4. A probe as claimed in claim 1, wherein said piezo-electric layer comprises three mutually separated sectors, each of said sectors being in communication with its own contact element.

5. A probe as claimed in claim 1, wherein said piezo-electric layer is a high-density polymer foil.

6. A probe as claimed in claim 1, wherein the surfaces of said discs facing away from said piezo-electric layer incorporate a copper coating.

7. A probe as claimed in claim 1, wherein the contact elements are pins which are conducted through an insulating disc in the receiving housing said pins being connected with a preamplifier through electrical lines, said preamplifier being in operative connection through an electrical line with the measuring evaluating unit and selectively with the measuring machine control.

8. A probe as claimed in claim 1, wherein said receiving housing is subjected to the action of a compression spring which is acted upon by a spring clamping means, said clamping means being axially displaceably connected with a probe housing.

9. A probe as claimed in claim 1, said second measuring signal generating installation further having a deflecting mechanism to which said feeler is connected and a measurement signal transmitter which is in connection through an electrical line with the measuring evaluating unit and selectively with the measuring machine control.

10. A probe as claimed in claim 1, wherein the contact elements are arranged on said piezo-electric layer and interconnected such that for an undivided layer there is attained a measuring signal upon an axial contacting, and for a layer of three sectors the signals from the individual sectors are separately processed such that for an axial contacting there is evaluated the sum of the three measuring signals and for a tangential contacting there is employed the difference between two measuring signals.

* * * * *

UNITED STATES PATENT AND TRADEMARK OFFICE
CERTIFICATE OF CORRECTION

PATENT NO. : 4,972,594
DATED : November 27, 1990
INVENTOR(S) : Werner Gurny & Eberhard Hausler It is certified that error appears in the above-identified patent and that said Letters Patent is hereby corrected as shown below:

Column 1 - Line 56 - delete "controlled"

Column 4 - Line 28 - delete "by itself"

Signed and Sealed this

Twenty-eighth Day of July, 1992

Attest:

DOUGLAS B. COMER

*Attesting Officer*     *Acting Commissioner of Patents and Trademarks*